May 31, 1955   G. W. COOMBE   2,709,326
BEAN CUTTING IMPLEMENT
Filed June 9, 1952   2 Sheets-Sheet 2

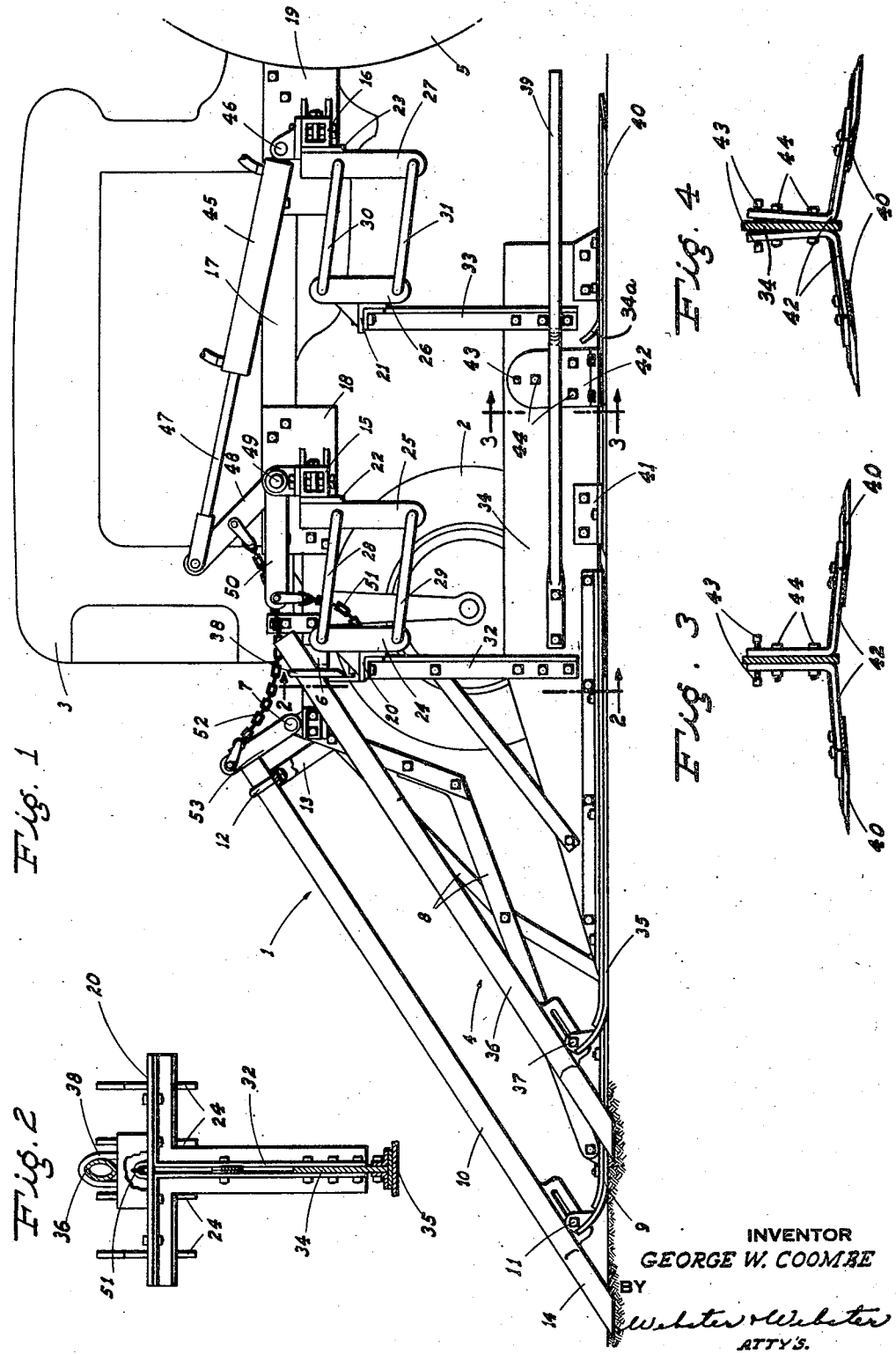

INVENTOR
GEORGE W. COOMBE
BY
Webster & Webster
ATTY'S.

United States Patent Office 2,709,326
Patented May 31, 1955

2,709,326

BEAN CUTTING IMPLEMENT

George W. Coombe, Vernalis, Calif.

Application June 9, 1952, Serial No. 292,539

1 Claim. (Cl. 55—64)

This invention is directed to, and it is a major object to provide, an improved tractor-mounted bean cutting implement; the latter—in its present embodiment—including a vine splitter and cutter unit on each side of the tractor, and a central vine splitter unit projecting ahead of the front of the tractor.

Another important object of the invention is to provide a bean cutting implement wherein the laterally disposed vine splitter and cutter units, as well as the central vine splitter unit, are of novel construction and mounted for relative vertical floating motion whereby to follow ground contour for best results, and without imposing any lift on the tractor—as otherwise occurs—when a rise is encountered by said units but not by the tractor wheels.

An additional object of the present invention is to provide each of said units, as above, with a ski-like ground runner; the laterally disposed vine splitter and cutter units including novel parallel linkage to permit the related cutter blades to readily move up or down in response to the position of the corresponding runner, yet without any substantial and undesirable side play or swaying.

A further object of the invention is to provide a novel power mechanism operative to lift the units clear of the ground for turning at the end of a field, or for transport from place to place.

A still further object of the invention is to provide a ready adjustment, for cant, of the rearwardly diverging blades of each vine splitter and cutter unit.

It is also an object of the invention to provide a bean cutting implement which is designed for ease and economy of manufacture; which is positive and stable in operation; and which requires a minimum of maintenance or repair.

Still another object of the invention is to provide a bean cutting implement, of the type described which is practical and reliable, and exceedingly effective for the purpose for which it is designed.

These objects are accomplished by means of such structure and relative arrangement of parts as will fully appear by a perusal of the following specification and claim.

In the drawings:

Fig. 1 is a side elevation of the implement as mounted on a tractor for use.

Fig. 2 is a fragmentary transverse section on line 2—2 of Fig. 1.

Fig. 3 is a fragmentary transverse section on line 3—3 of Fig. 1, showing the blades as set for minimum lateral cant.

Fig. 4 is a similar view but shows the blades adjusted for greater lateral cant.

Figure 5:
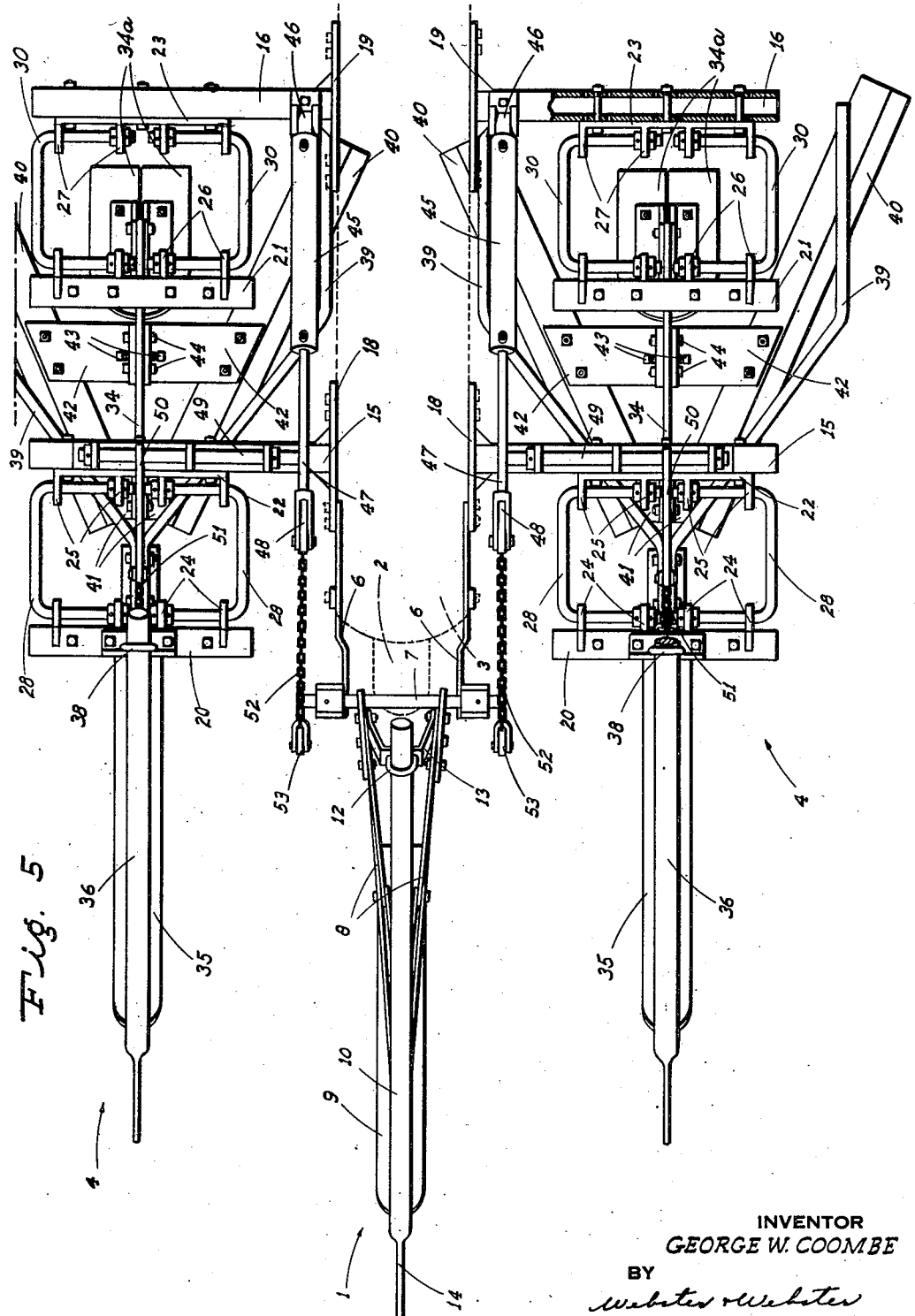
Fig. 5 is a plan view of the implement as mounted on a tractor for use.

Referring now more particularly to the characters of reference on the drawings, the implement comprises a central, vine splitter unit 1 which projects ahead of the single front wheel 2 of the tractor 3, and separate vine splitter and cutter units 4 disposed to the sides of such tractor ahead of the rear wheels 5.

The vine splitter unit 1 comprises mounting arms 6 which project forward from the front of the tractor 3 to support a rotatable cross shaft 7. A rigid elongated frame structure 8 is fixed to the cross shaft 7 and normally extends at a forward and downward incline to connection at spaced points to a central ski-like runner 9.

A vine splitter bar 10 is longitudinally adjustably connected, as at 11, to the forward portion of runner 9 and thence extends at an upward and rearward incline through a clamp 12 on a small inverted U-frame 13 which upstands from the frame structure 8 at its upper end portion. The splitter bar 10 projects ahead of the connection 11 as a flat-sided tooth or plow 14.

As the implement advances, the above described splitter unit 1 runs between adjacent rows of bean vines effectively separating or splitting the same apart. Thereafter, the trailing and laterally disposed vine splitter and cutter units 4 come into play, and as such units are identical except for being right and left hand, a description of one will suffice for both.

Each unit 4 comprises front and rear, laterally projecting mounting beams 15 and 16 secured to the tractor frame 17, ahead of the rear wheels 5, by means of attachment plates 18 and 19, respectively; the spacing of such beams being substantially as shown.

Forward cross bars 20 and 21 are disposed ahead of the related mounting beams 15 and 16, while said beams carry, on the frontside, rearward cross bars, indicated at 22 and 23, respectively; the latter cross bars being adjustable transversely of the direction of travel in the manner shown.

A plurality of transversely spaced, vertical attachment arms 24 and 25 are secured to the cross bars 20 and 22, respectively, in alinement, while similar attachment arms 26 and 27 are secured to the cross bars 21 and 23. Alined ones of the arms 24 and 25, and 26 and 27, are connected by upper and lower pairs of parallel links, the forward links being indicated at 28 and 29, and the rearward links at 30 and 31. The links of each pair are U-shaped and opposed, with the legs pivoted to adjacent attachment arms, as illustrated.

With such linkage assembly, the cross bars 20 and 21 are mounted for up and down floating, yet without undesirable lateral play.

Standards 32 and 33 are fixed to, and depend from, the cross bars 20 and 21, and at their lower ends such standards are fixed to a longitudinal, on-edge, central mounting plate 34; such plate extending ahead of the standard 32 and from adjacent the latter being carried on a ski-like runner 35.

A splitter bar 36, formed much the same as the splitter bar 10, is secured adjacent but short of its lower end to the front of runner 35 by an adjustable connection 37. From the connection 37, the splitter bar extends at an upward and rearward incline, being held in an eye 38 upstanding from cross bar 20.

At its rear, the mounting plate 34 is supported from the ground by short, side by side runners 34a.

A pair of above-ground, vine deflector rods 39 diverge rearwardly from the central mounting plate 34, being secured to the latter adjacent standard 32, and below such rods are similarly diverging vine cutter blades, indicated at 40. The blades 40 are attached to the central mounting plate 34 by forward L-brackets 41 and intermediate L-brackets 42. In order to impart a transverse cant to the rearwardly diverging blades 40, when working conditions require, opposed set screws 43, on the top of brackets 42, are run in against the plate 34 which tilts such brackets and cants the blades. See Fig. 4. To permit of such setting, the bolts 44 of brackets 42 are first loosened, as may be the corresponding bolts of the brackets 41.

The blades 40 are of such length and transverse span that as the tractor advances, with the central vine splitter unit 1 working between adjacent rows, the units 4 cut or slice the vines from the roots in corresponding ones of said adjacent rows as well as in the next laterally outer rows; the splitter bars 36 of said units 4 acting, in advance, to effectively separate or divide the vines between said rows for cutting by the blades 40.

As the vine splitter unit 1, and the vine splitter and cutter units 4, are each individually vertically floatable in response to adjacent ground contours, such units do not impose up-thrust on the tractor and which would cause loss of traction.

When the implement is used on a tractor having a single, central front wheel 2, such wheel trails the splitter unit 1 and thus is prevented from entangling with the vines.

By virtue of the fact that the cross bars 22 and 23 are adjustable transversely of the direction of travel, the blades can be pre-set laterally with proper spacing between the adjacent rear corners of the inner blades 40 of the units 4.

The following power mechanism is employed to lift the units 1 and 4 for turning in the field or for transport.

A fluid pressure actuated power cylinder 45 is pivoted, at its rear end, as at 46, to each rear mounting beam 16, and thence extends forward, with the piston rod 47 connected to the upper end of a radial lever arm 48 on a cross shaft 49 journaled on the related front mounting beam 15. A radial lift arm 50 projects forward from each cross shaft 49, and a chain 51 connects each lift arm 50 with the adjacent forward cross bar 20.

Another chain 52 couples between each radial lever arm 48 and corresponding arms 53 which upstand from the ends of cross shaft 7.

The chains 51 and 52 are normally slack, with the piston rods 47 advanced, but upon operation of the cylinders 45 to retract such rods, the chains tension and lift the units 1 and 4 in unison to an above-ground position.

The cylinders 45 are controlled by a valve regulated, fluid pressure conduit system (not shown).

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent is desired:

In a tractor-mounted beam vine cutter, a horizontal longitudinal cutter-blade mounting plate, longitudinally spaced standards rigid with and upstanding from the plate, cross bars rigid with and mounted on the standards at their upper end, longitudinally spaced mounting beams on the tractor projecting laterally from the tractor in horizontally spaced relation to and corresponding to the cross bars, laterally spaced vertical arms secured to the adjacent faces of corresponding mounting beams and cross bars, and a parallel linkage assembly connected between each mounting beam and the corresponding cross bar, each assembly comprising a pair of laterally spaced upper and lower links of U-shaped form in plan and facing each other, the legs of the links being journaled in the arms at vertically spaced points thereon.

References Cited in the file of this patent

UNITED STATES PATENTS

| Re. 22,182 | Tuft et al. | Sept. 22, 1942 |
| 2,139,979 | Sheehan et al. | Dec. 13, 1938 |
| 2,305,254 | Hirschkorn | Dec. 15, 1942 |
| 2,614,376 | Madsen | Oct. 21, 1952 |